United States Patent
Kaibara

(10) Patent No.: US 8,164,654 B2
(45) Date of Patent: Apr. 24, 2012

(54) IMAGE STORAGE APPARATUS, IMAGE STORAGE METHOD, AND CONTROL PROGRAM EXECUTED IN IMAGE STORAGE APPARATUS

(75) Inventor: Hiroshi Kaibara, Yokohama (JP)

(73) Assignee: Canon Kabushiki Kaisha (JP)

( * ) Notice: Subject to any disclaimer, the term of this patent is extended or adjusted under 35 U.S.C. 154(b) by 487 days.

(21) Appl. No.: 11/457,324

(22) Filed: Jul. 13, 2006

(65) Prior Publication Data

US 2007/0013788 A1    Jan. 18, 2007

(30) Foreign Application Priority Data

Jul. 14, 2005    (JP) .................................. 2005-205766

(51) Int. Cl.
*H04N 5/76* (2006.01)
(52) U.S. Cl. .................................................. 348/231.2
(58) Field of Classification Search ............... 348/231.3, 348/231.2, 231.6, 231.8, 231.99
See application file for complete search history.

(56) References Cited

U.S. PATENT DOCUMENTS

| | | | |
|---|---|---|---|
| 6,005,690 A | | 12/1999 | Suzuki et al. |
| 6,256,059 B1 * | | 7/2001 | Fichtner .................... 348/222.1 |
| 6,295,391 B1 * | | 9/2001 | Rudd et al. .................... 382/313 |
| 6,625,334 B1 * | | 9/2003 | Shiota et al. .................. 382/305 |
| 6,812,961 B1 * | | 11/2004 | Parulski et al. ............. 348/231.2 |
| 6,856,348 B1 * | | 2/2005 | Okada ........................ 348/231.2 |
| 6,865,583 B2 * | | 3/2005 | Stockley ............................. 1/1 |
| 6,967,675 B1 * | | 11/2005 | Ito et al. ...................... 348/207.1 |
| 7,053,936 B2 * | | 5/2006 | Imura et al. ................. 348/231.2 |
| 7,075,573 B2 * | | 7/2006 | Imaeda ...................... 348/231.99 |
| 7,099,869 B1 * | | 8/2006 | Forstall et al. ........................ 1/1 |
| 7,265,780 B2 | | 9/2007 | Tanaka et al. |
| 7,289,977 B2 * | | 10/2007 | Kawaoka ...................... 386/225 |
| 7,676,116 B2 * | | 3/2010 | Tamai et al. .................. 382/305 |
| 2001/0041056 A1 | | 11/2001 | Tanaka et al. |
| 2003/0052986 A1 * | | 3/2003 | Matsumoto .............. 348/333.05 |
| 2004/0051784 A1 * | | 3/2004 | Ejima et al. .............. 348/207.99 |
| 2004/0119846 A1 * | | 6/2004 | Inou ........................ 348/231.99 |
| 2005/0111034 A1 * | | 5/2005 | Karasaki et al. ............. 358/1.15 |

(Continued)

FOREIGN PATENT DOCUMENTS

JP    2001095801 A  *  4/2001

(Continued)

OTHER PUBLICATIONS

Microsoft, "Rename a batch of photos all at once", Jun. 20, 2005, www.microsoft.com p. 1-2 of 2.*

*Primary Examiner* — Jason Chan
*Assistant Examiner* — Gary C Vieaux
(74) *Attorney, Agent, or Firm* — Rossi, Kimms & McDowell LLP

(57) ABSTRACT

An image storage apparatus which is capable of finding a desired image among a large number of images easily. Image quality of an image to be recorded on a storage medium 200 or 210 is determined by an operation unit 70. A system control circuit 50 stores a first image having an image quality determined by the operation unit 70 in a first folder on the storage medium 200 or 210, and stores a second image having an image quality determined by the operation unit 70 and different from the image quality of the first image in a second folder on the storage medium 200 or 210.

16 Claims, 4 Drawing Sheets

U.S. PATENT DOCUMENTS

| | | | |
|---|---|---|---|
| 2005/0117030 A1* | 6/2005 | Kim | 348/231.1 |
| 2005/0128316 A1* | 6/2005 | Sugimori | 348/223.1 |
| 2005/0141848 A1* | 6/2005 | Deguchi et al. | 386/1 |
| 2005/0146639 A1* | 7/2005 | Onuki | 348/371 |
| 2005/0185837 A1* | 8/2005 | Takano et al. | 382/162 |
| 2005/0259163 A1* | 11/2005 | Tsujii et al. | 348/231.2 |
| 2006/0119713 A1* | 6/2006 | Deguchi et al. | 348/231.7 |

FOREIGN PATENT DOCUMENTS

| | | | |
|---|---|---|---|
| JP | 2001-230999 A | | 8/2001 |
| JP | 2002-033953 A | | 1/2002 |
| JP | 2003-153297 A | | 5/2003 |
| JP | 2003-209725 A | | 7/2003 |
| JP | 2004-120773 A | | 4/2004 |
| JP | 2004-312367 A | | 11/2004 |
| JP | 2005-049968 A | | 2/2005 |
| JP | 2005-064927 A | | 3/2005 |
| JP | 2005086606 A | * | 3/2005 |
| JP | 2005-094541 A | | 4/2005 |

* cited by examiner

IMAGE STORAGE APPARATUS, IMAGE STORAGE METHOD, AND CONTROL PROGRAM EXECUTED IN IMAGE STORAGE APPARATUS

BACKGROUND OF THE INVENTION

1. Field of the Invention

The present invention relates to an image storage apparatus such as a camera, digital camera, or video camera, an image storage method, and a control program executed in the image storage apparatus.

2. Description of the Related Art

In recent years, development of digital cameras has been actively pursued. Images shot with a digital camera are stored on a removable medium, and the images stored on the medium are viewed or printed with a PC.

There have been known a digital camera which stores shot images in separate folders for each shooting mode or for each release switch to easily retrieve images stored on a medium (see Japanese Laid-Open Patent Publication (Kokai) No. 2003-209725).

However, as the capacity of media has become large, finding an image to be printed among a large number of images is difficult. Also, when a single image is shot for a memo or for uploading onto a web server, it is difficult to find the image later.

SUMMARY OF THE INVENTION

It is an object of the present invention to provide an image storage apparatus, an image storage method, and a control program executed in the image storage apparatus, which are capable of finding a desired image among a large number of images easily.

To attain the above object, in a first aspect of the present invention, there is provided an image storage apparatus comprising a shooting unit that shoots a subject and outputs image information, an image development unit that develops the image information as an image, an image recording unit that records the developed image on a storage medium, and an image quality determination unit that determines the image quality of the image to be recorded by the image recording unit on the storage medium, wherein the image recording unit stores a first image having an image quality determined by the image quality determination unit in a first folder on the storage medium, and stores a second image having an image quality determined by the image quality determination unit and different from the image quality of the first image in a second folder on the storage medium.

According to this arrangement, a first folder and a second folder are created on a storage medium when a developed image is stored on the storage medium. A first image having an image quality determined by an image quality determination unit is stored in the first folder, and a second image having an image quality determined by the image quality determination unit and different from the image quality of the first image is stored in the second folder. For example, only images for printing may be collected in a folder different from a folder that stores original images. As a result, a desired image can be easily found among a large number of images.

Preferably, the image recording unit creates the first folder and the second folder on the storage medium when the developed image is recorded on the storage medium.

Preferably, the structure of the first folder and the stored-image name of the first image stored in the first folder follow a digital camera format, and the structure of the second folder and the stored-image name of the second image stored in the second folder do not follow the digital camera format.

Preferably, the second image stored in the second folder has at least one of a smaller size, a higher sharpness, a higher color saturation, and a different aspect ratio, compared to the first image stored in the first folder.

Preferably, the second image stored in the second folder has date and time information embedded therein.

Preferably, the second image stored in the second folder has a predetermined upper limit value on the data size.

Preferably, the image storage apparatus comprises a recording mode selection unit having a first recording mode in which the first image and the second image are recorded on the storage medium, a second recording mode in which only the first image is recorded on the storage medium, and a third recording mode in which only the second image is recorded on the storage medium.

Preferably, the image storage apparatus comprises a number-of-stored-images determination unit that determines the number of second images stored in the second folder, wherein as many second images as determined by the number-of-stored-images determination unit are stored in the second folder.

Preferably, the image storage apparatus comprises an image display unit that displays an image shot by the shooting unit, and a display mode selection unit that has a first display mode in which the first image and the second image are displayed on the image display unit, a second display mode in which only the first image is displayed on the image display unit, and a third display mode in which only the second image is displayed on the image display unit.

More preferably, when the first image or the second image is being displayed, the image display unit simultaneously displays indication information that indicates whether the information being displayed is the first image or the second image.

Preferably, the image storage apparatus comprises an image deletion unit that deletes at least one of the first image and the second image stored on the storage medium.

More preferably, the image deletion unit simultaneously deletes the second image corresponding to the first image when the first image is deleted from the storage medium.

More preferably, the image storage apparatus comprises a connection unit that connects to an external apparatus, and a transmission unit that transmits at least one of the first image and the second image stored on the storage medium to the external apparatus via the connection unit, wherein the image deletion unit deletes from the storage medium the image transmitted to the external apparatus.

Further preferably, when the second image is transmitted to the external apparatus from the transmission unit, the image deletion unit deletes from the storage medium the second image transmitted to the external apparatus and the first image corresponding to the second image.

Preferably, the image storage apparatus comprises an image display unit that displays an image shot by the shooting unit, a storage instruction unit that instructs to store the second image in the second folder when the first image is being replayed on the image display unit, and a second image generation unit that generates the second image from the first image being replayed on the image display unit according to an instruction of the storage instruction unit.

To attain the above object, in a second aspect of the present invention, there is provided an image storage method comprising a shooting step of shooting a subject and outputs image information, an image development step of developing the image information as an image, an image recording step of recording the developed image on a storage medium, and an image quality determination step of determining the image quality of the image to be recorded on the storage medium in the image recording step, wherein in the image recording step, a first image having an image quality determined by the image quality determination step is stored in a first folder on the storage medium, and a second image having an image quality determined in the image quality determination step and different from the image quality of the first image is stored in a second folder on the storage medium.

To attain the above object, in a third aspect of the present invention, there is provided a control program executed in an image storage apparatus, comprising a shooting module for shooting a subject and outputting image information, an image development module for developing the image information as an image, an image recording module for recording the developed image on a storage medium, and an image quality determination module for determining the image quality of the image to be recorded by the image recording module on the storage medium, wherein a first image having an image quality determined by the image quality determination module is stored in a first folder on the storage medium, and a second image having an image quality determined by the image quality determination module and different from the image quality of the first image is stored in a second folder on the storage medium.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
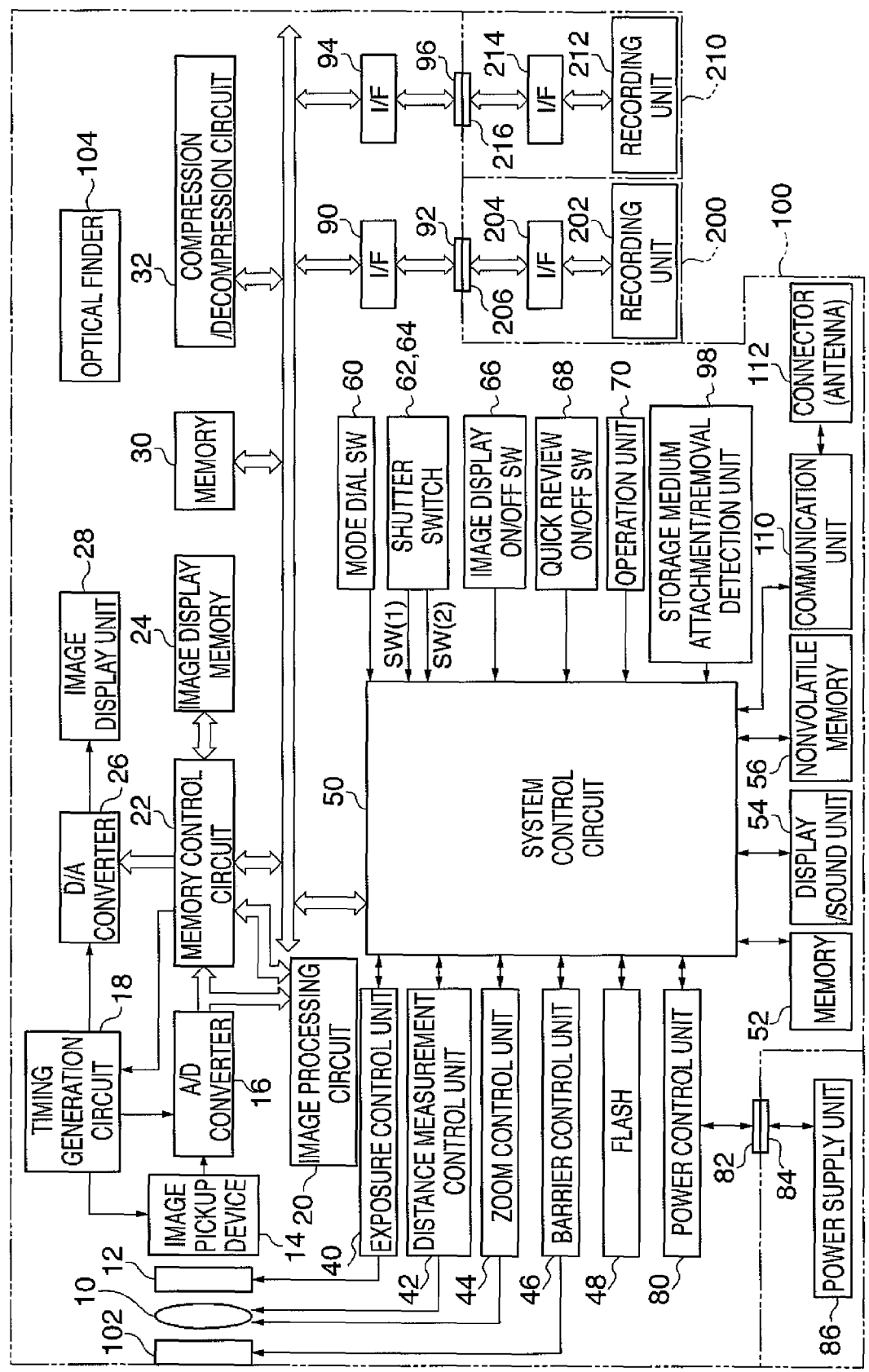
FIG. 1 is a block diagram showing the configuration of an image storage apparatus according to an embodiment of the present invention.

FIG. 1 is a block diagram showing the configuration of an image storage apparatus according to an embodiment of the present invention.

In this figure, the image storage apparatus is a digital camera 100.

Reference numeral 10 denotes a shooting lens, reference numeral 12 denotes a shutter with a diaphragm function, reference numeral 14 denotes an image pickup device that converts an optical image into an electric signal, and reference numeral 16 denotes an A/D converter that converts an analog signal output from the image pickup device 14 into a digital signal.

Reference numeral 18 denotes a timing generation circuit that supplies clock signals and control signals to the image pickup device 14, the A/D F converter 16, and a D/A converter 26. The timing generation circuit 18 is controlled by a memory control circuit 22 and a system control circuit 50.

Reference numeral 20 denotes an image processing circuit that performs predetermined pixel interpolation processing and color conversion processing on data from the A/D converter 16 or data from the memory control circuit 22.

The image processing circuit 20 also performs predetermined computational processing using shot image data, and performs TTL-mode AWB (Auto White Balance) processing based on the result of the computational processing.

Reference numeral 22 denotes the memory control circuit. The memory control circuit 22 controls the A/D converter 16, the timing generation circuit 18, the image processing circuit 20, an image display memory 24, the D/A converter 26, a memory 30, and a compression/decompression circuit 32.

Data from the A/D converter 16 is written to the image display memory 24 or the memory 30 via the image processing circuit 20 and the memory control circuit 22, or via only the memory control circuit 22.

Reference numeral 24 denotes the image display memory, reference numeral 26 denotes the D/A converter, and reference numeral 28 denotes an image display unit implemented as a TFT-LCD (Thin Film Transistor-Liquid Crystal Display) or the like. Image data for display written into the image display memory 24 is displayed on the image display unit 28 via the D/A converter 26. The image display unit 29 sequentially displays the shot image data to thereby realize an electronic finder function.

The image display unit 28 is capable of selectively turning on or off the display in response to an instruction from the system control circuit 50. Turning the display off may significantly reduce the power consumption of the digital camera 100.

Reference numeral 30 denotes the memory for storing still images and moving images that have been shot. The memory 30 has enough storage capacity to store a predetermined number of still images and moving images recorded for a predetermined time period. Therefore, a large amount of images can be written into the memory 30 at a high speed even in continuous shooting or panoramic shooting in which a plurality of still images are continuously shot. The memory 30 may also be used as a working area for the system control circuit 50.

Reference numeral 32 denotes the compression/decompression circuit that compresses or decompresses image data using a technique such as adaptive discrete cosine transform (ADCT). The compression/decompression circuit 30 reads image data stored in the memory 30 to perform compression processing or decompression processing, and writes the image data subjected to either processing into the memory 30.

Reference numeral 40 denotes an exposure control unit that controls the shutter 12 having the diaphragm function. The exposure control unit 40 also cooperates with a flash 48 to provide a flash light-adjustment function.

Reference numeral 42 denotes a distance measurement control unit that controls a focusing operation of the shooting lens 10. Reference numeral 44 denotes a zoom control unit that controls a zooming operation of the shooting lens 10. Reference numeral 46 denotes a barrier control unit that controls a operation of a protection unit 102.

Reference numeral 48 denotes the flash that has an AF fill-light emission function and the flash light-adjustment function.

The system control circuit 50 controls the exposure control unit 40 and the distance measurement control unit 42 based on the result of the computational processing obtained by the image processing circuit 20. This allows the exposure control unit 40 and the distance measurement control unit 42 to perform processing such as TTL (Through The Lens)-mode AF (Auto Focus) processing, AE (Auto Exposure) processing, and EF (flash pre-emission) processing. The system control circuit 50 further controls the entire digital camera 100.

Reference numeral 52 denotes a memory that stores constants and variables, programs, and so forth for operation of the system control circuit 50.

Reference numeral 54 denotes a display/sound unit that displays and reads out the operation state and messages using texts, images, or sound according to execution of programs in the system control circuit 50.

For example, the display/sound unit 54 is implemented as a combination of an LCD, an LED, a sound device, and so forth. Part of the display functions of the display/sound unit 54 is provided in an optical finder 104.

Among the contents to be displayed by the display/sound unit 54, those provided on the LCD and so forth include: a single shot/continuous shot display, a self timer display, a compression rate display, a display indicating the number of recorded pixels, a display indicating the number of recorded shots, a display indicating the number of remaining shots, a shutter speed display, a diaphragm value display, an exposure correction display, a flash display, a red-eye reduction display, a macro shooting display, a beep setting display, a display indicating the remaining battery power for the clock, a remaining battery power display, an error display, an information display using a multi-digit number, a display indicating attached/removed state of storage media 200 and 210, a communication I/F operation display, and a date and time display.

Among the contents to be displayed by the display/sound unit 54, those provided in the optical finder 104 include: a focusing display, a camera shake alarm display, a flash recharge display, a shutter speed display, a diaphragm value display, and an exposure correction display. Reference numeral 56 denotes an electrically erasable and recordable nonvolatile memory. For example, an EEPROM may be used.

Reference numerals 60, 62, 64, 66, 68, and 70 denote operating means for inputting various operation commands for the system control circuit 50. They are implemented as one or a combination of switches, dials, a touch panel, a pointing mechanism using eye-gaze detection, and a speech recognition device.

Reference numeral 60 denotes a mode dial switch that allows switching among functional modes, such as a power-off mode, an automatic shooting mode, a shooting mode, a panoramic shooting mode, a replay mode, a multi-screen replay/delete mode, and a PC connection mode. In this embodiment, the mode dial switch 60 is particularly used to switch the settings of whether image data is stored in a separate directory.

Reference numeral 62 denotes a shutter switch SW (1). The shutter switch SW (1) is turned on in the middle of operation of a shutter button (not shown) to indicate the start of an operation such as AF (Auto Focus) processing, AE (Auto Exposure) processing, AWB (Auto White Balance) processing, and EF (flash pre-emission) processing.

Reference numeral 64 denotes a shutter switch SW (2). The shutter switch SW (2) is turned on upon completion of operation of the shutter button, not shown, to indicate the start of a sequence of processing including: exposure processing in which a signal read from the image pickup device 14 is written as image data to the memory 30 via the A/D converter 16 and the memory control circuit 22; development processing using computation in the image processing circuit 20 and the memory control circuit 22; and recording processing in which the image data is read from the memory 30, compressed in the compression/decompression circuit 32, and written into the storage medium 200 or 210.

Reference numeral 66 denotes an image display on/off switch that can be used to carry out a setting of turning on or off the image display unit 28. This function allows power savings by shutting off power supply to the image display unit 28 including the TTFT-LCD or the like when the optical finder 104 is used for shooting.

Reference numeral 68 denotes a quick review on/off switch that is used to set a quick review function for automatically replaying shot image data just after shooting.

Reference numeral 70 denotes an operation unit comprised of various buttons and a touch panel, such as a menu button, a setting button, a macro button, a multi-screen replay and page-turning button, a flash setting button, a single shot/continuous shot/self timer switching button, a menu shift + (plus) button, a menu shift − (minus) button, a replayed image shift + (plus) button, a replayed image shift − (minus) button, a shot image quality selection button, an exposure correction button, and a date/time setting button. The operation unit 70 may also be used to specify that second image data should be stored, as described below. The setting of the shot image quality selection button allows the system control circuit 50 to set the image quality of a first image and a second image as described below.

Reference numeral 80 denotes a power control unit including a battery detection circuit, a DC-DC converter, and a switching circuit for switching among blocks to be energized. The power control unit 80 detects the existence/absence of a battery, the type of the battery, and the remaining battery power. The power control unit 80 controls the DC-DC converter based on the detection result and instructions from the system control circuit 50, and supplies a required voltage for a predetermined time period to components including the storage media.

Reference numerals 82 and 84 denote connectors. Reference numeral 86 denotes a power supply unit including a primary battery such as an alkaline battery or lithium battery, a secondary battery such as a NiCd battery, NiMH battery, or Li battery, and an AC adaptor.

Reference numerals 90 and 94 denote interfaces to the storage media such as a memory card and hard disk. Reference numerals 92 and 96 denote connectors that connect with the storage media such as a memory card and hard disk. Reference numeral 98 denotes a storage medium attachment/removal detection unit that detects whether or not the storage medium 200 or 210 is attached to the connector 92 or 96.

In this embodiment, the digital camera 100 has two interfaces and connectors for attaching the storage media. However, there may be one or more interfaces and connectors for attaching the storage media. A combination of interfaces and connectors of different standards may also be provided. The interfaces and connectors may be implemented by ones compliant with the standard of a PCMCIA (Personal Computer Memory Card International Association) card, a CF (Compact Flash) card, or the like.

When the interfaces 90 and 94 and the connectors 92 and 96 are implemented by ones compliant with the standard of the PCMCIA card, the CF card, or the like, various communication cards may be connected to the interfaces and connectors, such as a LAN card, a modem card, a USB card, an IEEE 1394 card, a P1284 card, a SCSI card, and a PHS communication card. This allows transmission and reception of image data and management information attached to the image data to and from a computer, or a peripheral apparatus such as a printer.

The protection unit 102 covers the lens 10 and its periphery of the digital camera 100 to protect the same from dirt and damage.

The optical finder 104 allows shooting without using the electronic finder function of the image display unit 28 but only with the optical finder 104.

Reference numeral 110 denotes a communication unit with communication functions based on the RS232C, USB, IEEE 1394, P1284, SCSI, modem, LAN, wireless communication and so forth.

Reference numeral 112 denotes a connector (an antenna in the case of wireless communication) that connects the digital camera 100 with another apparatus via the communication unit 110.

The storage medium 200 is a memory card, a hard disk, or the like. The storage medium 200 includes: a recording unit 202 implemented as a semiconductor memory, a magnetic disk, or the like; an interface 204 to the digital camera 100; and a connector 206 that connects with the digital camera 100.

The storage medium 210 is also a memory card, a hard disk, or the like. The storage medium 210 includes: a recording unit 212 implemented as a semiconductor memory, a magnetic disk, or the like; an interface 214 to the digital camera 100; and a connector 216 that connects with the digital camera 100.

Now, image storage processing performed in the digital camera 100 will be described below.

In this embodiment, it is assumed that images for printing are stored in a folder separate from a regular folder at the time of shooting. An original image is called a first image, and an image for printing is called a second image.

The second image is formed by optimizing the size and image quality of the first image for printing. That is, the second image is smaller than the first image in a file size, the aspect ratio of the second image is adapted to the printing paper, and the sharpness and the color saturation of the second image are set higher than those of the first image. The second image also has date and time information embedded therein as YUV data. These settings are set in the system control circuit 50 via the operation unit 70.

In particular, the image quality of the first image and the second image is set in the system control circuit 50 by the setting of the shot image quality selection button of the operation unit 70.

The settings are not limited to those listed above, but various settings are possible according to programs of the system control circuit 50.

Figure 2:
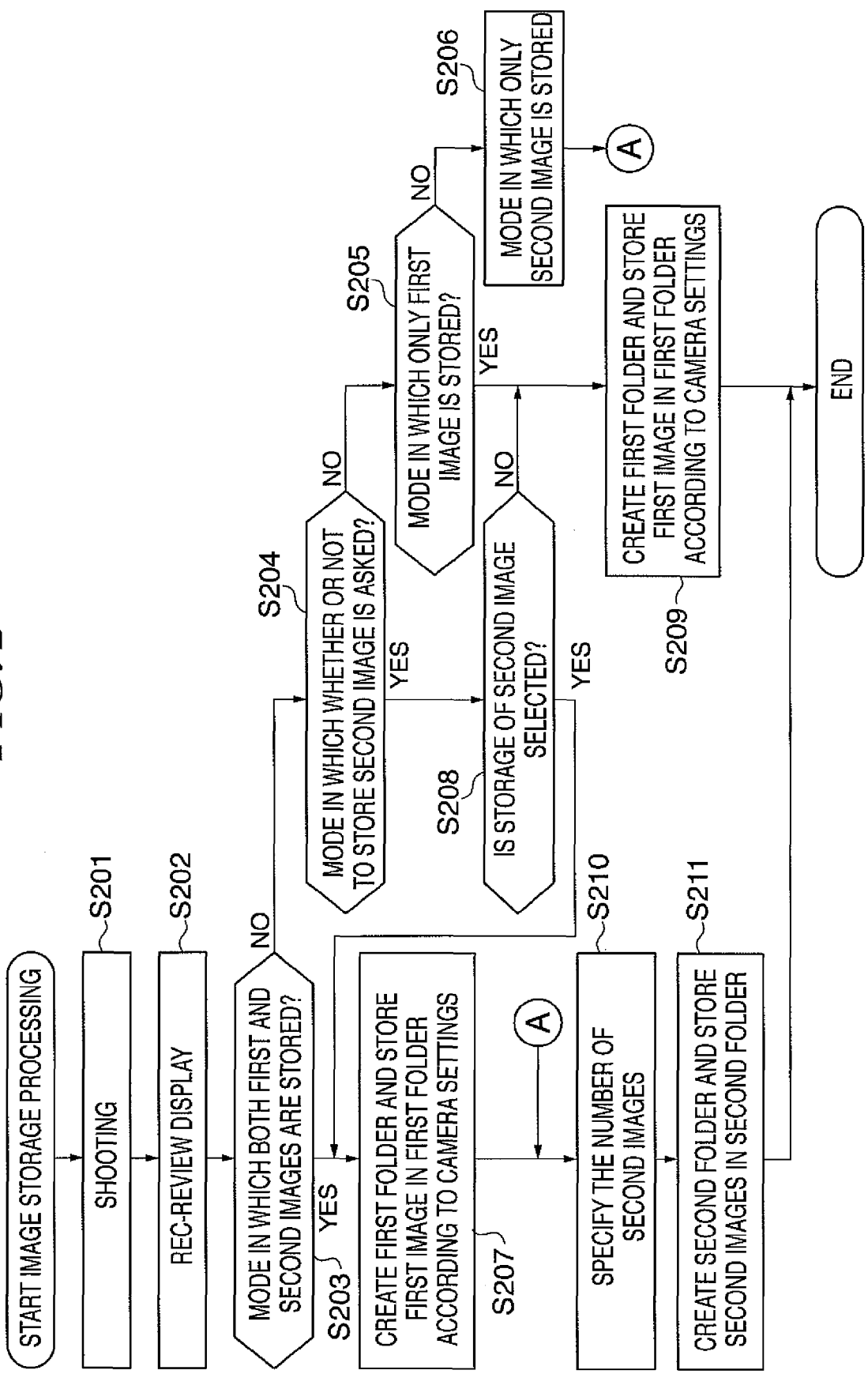
FIG. 2 is a flowchart showing image storage processing executed in a digital camera.

FIG. 2 is a flowchart showing image storage processing executed in the digital camera 100. This processing is mainly performed by the system control circuit 50.

When a press on the shutter switch SW (2) 64 is detected, shooting is started (step S201). A shot image is displayed on the display/sound unit 54 in the rec-review mode (step S202).

It is determined whether or not the mode dial switch 60 is set to the mode in which the first and second images are stored (step S203). If the mode dial switch 60 is set to the mode in which the first and second images are stored, the following process is performed according to the settings for that mode: a first folder is created on the storage medium 200 or 210; a first image is generated according to the DCF (Digital Camera Format) and to the image quality setting of the shot image quality selection button; and the generated first image is stored in the first folder on the storage medium 200 or 210 (step S207).

When the number of second images to be stored on the storage medium 200 or 210 is specified via the operation unit 70 in the rec-review mode (step S210), the following process is performed: a second folder is created on the storage medium 200 or 210; as many second images as specified at step S210 are generated according to the image quality setting of the shot image quality selection button; the generated second images are stored in the second folder on the storage medium 200 or 210 (step S211); and the processing terminates. The file names of the second images need not follow the DCF (Digital Camera Format).

If it is determined at step S203 that the mode dial switch 60 is not set to the mode in which the first and second images are stored, it is determined whether or not the apparatus is in the mode in which the display/sound unit 54 asks whether or not to store the second image (step S204).

If it is determined at step S204 that the apparatus is in the mode in which the display/sound unit 54 asks whether or not to store the second image, it is determined whether or not storage of the second image is selected via the operation unit 70 (step S208).

If it is determined at step S208 that storage of the second image is selected via the operation unit 70, the processing proceeds to the above-described step S207. On the other hand, if storage of the second images is not selected via the operation unit 70, the processing proceeds to step S209 described below.

If it is determined at the above step S204 that the apparatus is not in the mode in which the display/sound unit 54 asks whether or not to store the second image, it is determined whether or not the mode dial switch 60 is set to the mode in which only the first image is stored (step S205).

If it is determined at step S205 that the mode dial switch 60 is set to the mode in which only the first image is stored, the following process is performed according to the settings for that mode: a first folder is created on the storage medium 200 or 210; only the first image is generated according to the DCF (Digital Camera Format) and to the image quality setting of the shot image quality selection button; the generated first image is stored in the first folder on the storage medium 200 or 210 (step S209); and the processing terminates.

If it is determined at step S205 that the mode dial switch 60 is not set to the mode in which only the first image is stored, the mode dial switch 60 is set to the mode in which only the second image is stored (step S206). Therefore, the processing proceeds to step S210 to specify via the operation unit 70 the number of the second images to be stored on the storage medium 200 or 210.

In this image storage processing, the digital camera 100 has two storage modes, i.e., the mode in which the first and second images are stored in the first and second folders on the storage medium 200 or 210 respectively, and the mode in which either one of the first and second images is stored in the first or second folder on the storage medium 200 or 210 (steps S203 to S206). However, not all these modes should necessarily be included.

It is to be understood that, although the second image differs from the first image in image size, aspect ratio, sharpness, or color saturation, other parameters may also vary. While the second image has the date and time information embedded therein as YUV data, the digital camera 100 may include a date and time information embedment setting unit for setting on/off of the embedment of the date and time information, or a parameter setting unit for setting the parameters themselves for the second images. Furthermore, an upper limit value setting unit for setting a predetermined upper limit value on the file size (the amount of data) of the second image may be provided.

In the above image storage processing, an example has been described in which an image for printing (the second image) is stored in a second folder different from a first folder that stores an original image (the first image). Besides these images, an image for uploading onto the Web (hereafter called a third image) may be stored in a separate folder. For example, since some upload environments define the upper limit value on the file size, this may be applied to creating and storing a file with the size of the upper limit value.

When the mode dial switch 60 is set to the replay mode and the first image is being displayed on the display/sound unit 54, the system control circuit 50 may, in response to a command from the operation unit 70 to store the second image, generate the second image from the first image being replayed and displayed.

Figure 3:
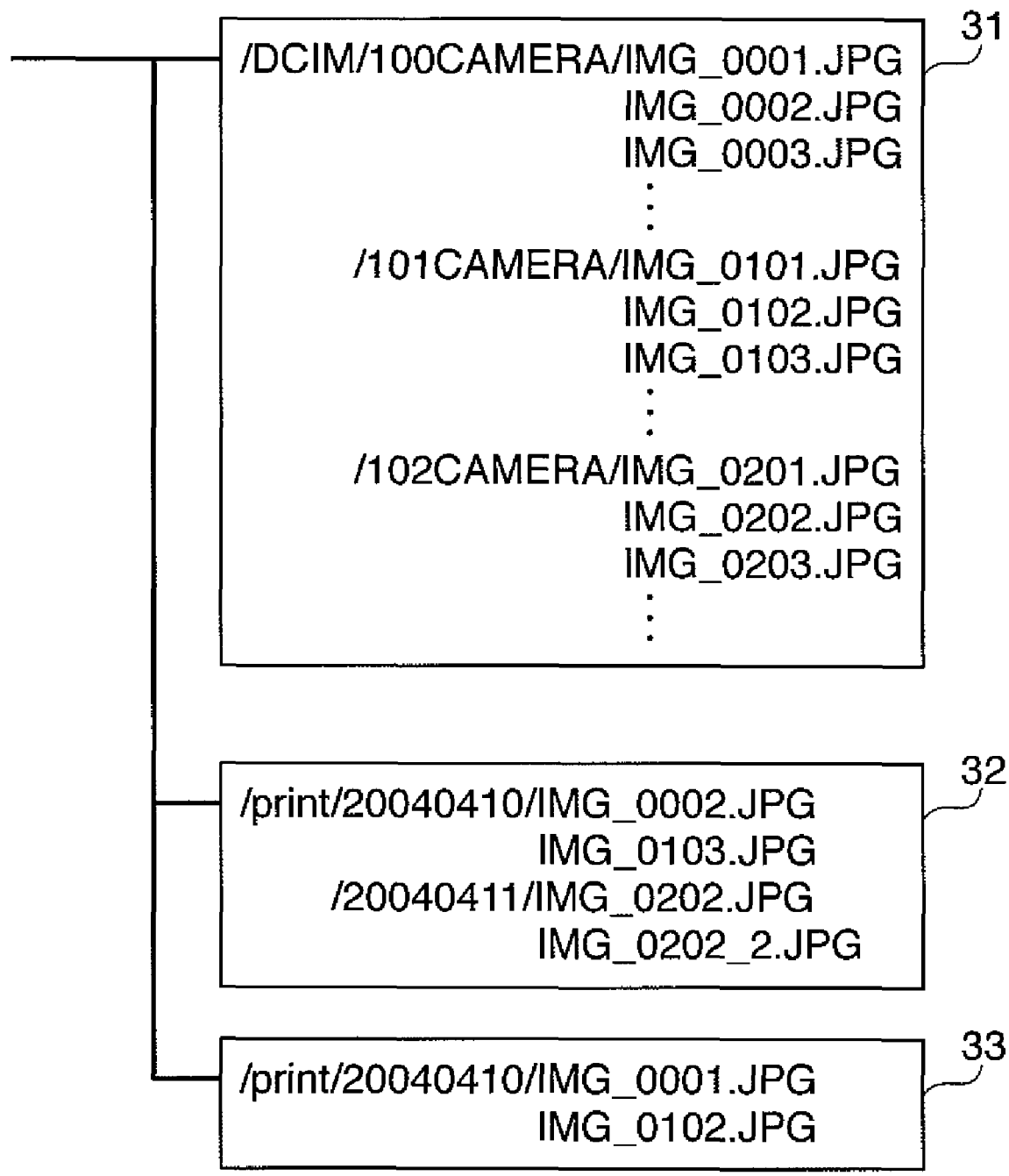
FIG. 3 is a diagram showing the folder structure for a recording medium.

FIG. 3 is a diagram showing the folder structure for the storage medium 200.

In FIG. 3, reference numeral 31 denotes the first folder that stores the first image according to the DCF (Digital Camera Format), reference numeral 32 denotes the second folder that stores the second image, and reference numeral 33 denotes a third folder that stores the third image. These folders are created by the system control circuit 50 when the first, second, or third image is stored on the storage medium 200. In the second and third folders, sub folders are created for each shooting date and time. Therefore, if there already exists a folder of the same shooting date and time, a new folder need not be created for each shooting but the obtained file may be stored in the existing folder. The file name of the second or third image is the same as that of the corresponding first image. If a file name different from that of the first image is used for the second or third images a link file for linking the file name of the first image and the corresponding file name of the second or third image is created, and the created link file is stored on the storage medium 200.

While the first image follows the DCF (Digital Camera Format), the second and third images need not follow the DCF (Digital Camera Format).

As shown in FIG. 3, if two images corresponding to the first image with the file name ING__0202.JPG are stored in the second folder, their file names will be IMG__0202.JPG and IMG__0202__2.JPG respectively.

The folder structure for the storage medium 201 is similar to that for the storage medium 200 and therefore will not be described.

Figure 4:
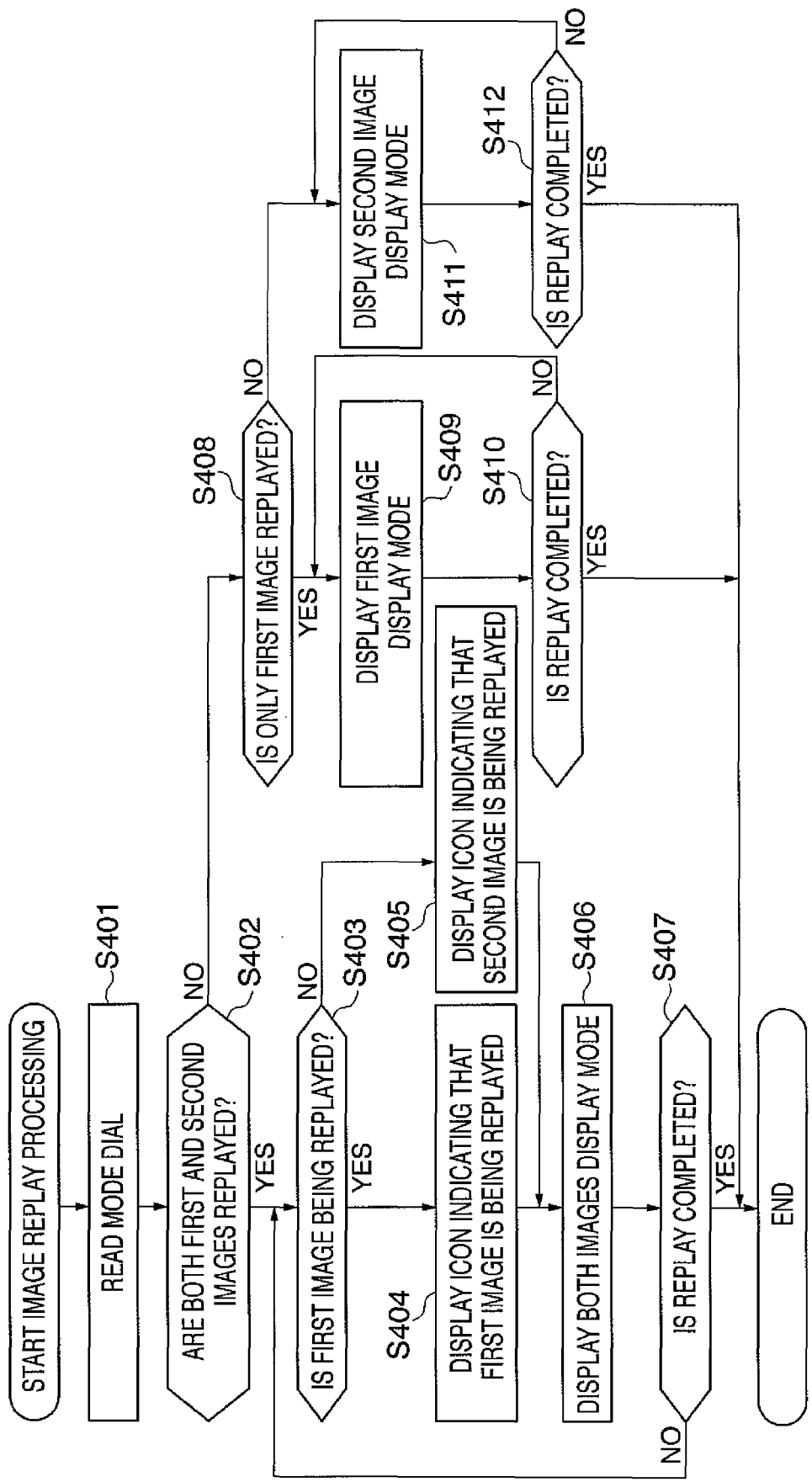
FIG. 4 is a flowchart showing image replay processing.

FIG. 4 is a flowchart showing image replay processing. This processing is mainly performed by the system control circuit 50. In this flowchart, it is assumed that only the first image and the second image are stored on the storage medium 200.

First, the state of the mode dial switch 60 is read (step S401) to determine whether or not the state of the mode dial switch 60 indicates the mode in which both the first and second images are replayed (step S402).

If it is determined at step S402 that the state indicates the mode in which both the first and second images are replayed, it is determined whether or not the image currently displayed on the display/sound unit 54 is the first image (step S403). In the mode in which both the first and second images are replayed, the system control circuit 50 replays the first image and then the second image, but alternatively it may replay the second image and then the first image.

If it is determined at step S403 that the image currently displayed on the display/sound unit 54 is the first image, an icon indicating that the first image is being replayed is displayed on the display/sound unit 54 (step S404). If the image currently displayed on the display/sound unit 54 is not the first image, i.e., if the image currently displayed on the display/sound unit 54 is the second image, an icon indicating that the second image is being replayed is displayed on the display/sound unit 54 (step S405).

In addition to the display of the icon at step S404 or S405, an icon indicating the mode in which both the first and second images are replayed is displayed on the display/sound unit 54 (step S406).

Then, it is determined whether or not the replay of both the first and second images is completed (step S407). If the replay of both images is completed, the processing terminates. If the replay of both images is not completed, the processing returns to step S403.

If it is determined at the above step S402 that the state does not indicate the mode in which both the first and second images are replayed, it is determined whether or not the state of the mode dial switch 60 indicates the mode in which only the first image is displayed (step S408).

If it is determined at step S408 that the state indicates the mode in which only the first image is displayed, an icon indicating the mode in which only the first image is displayed is displayed on the display/sound unit 54 (step S409). Then, it is determined whether or not the replay of the first image is completed (step S410). If the replay of the first image is completed, the processing terminates. If the replay of the first image is not completed, the processing returns to step S409.

If it is determined at step S408 that the state does not indicate the mode in which only the first image is displayed, i.e., the state indicates the mode in which only the second image is displayed, an icon indicating the mode in which only the second image is displayed is displayed on the display/sound unit 54 (step S411). Then, it is determined whether or not the replay of the second image completed (step S412). If the replay of the second image is completed, the processing terminates. If the replay of the second image is not completed, the processing returns to step S411.

As described in detail above, according to this embodiment, the first folder and the second folder are automatically created on the storage medium 200 (or the storage medium 210) when an image is stored on the storage medium 200 (or the storage medium 210) (steps S207, S209, and S211) The first image having an image quality determined by pressing the shot image quality selection button of the operation unit 70 is automatically stored in the first folder. The second image having an image quality determined by pressing the shot image quality selection button of the operation unit 70 and different from the image quality of the first image is automatically stored in the second folder (steps S207, S209, and S211). For example, only images for printing may be collected in a folder different from a folder that stores original images. Thus, a desired image can be easily found among a large number of images.

A user may load onto a PC, or may directly print, only the images in the second folder for a printing purpose. Furthermore, since the second images are optimized for printing, prints of high usability and quality may be obtained. When the printing is finished, the second images may be deleted because the first images still exist. This advantageously serves to organize the images.

When, for example, shooting of a single image for uploading onto the Web or for printing is desired, only shooting in a regular manner can cause automatic generation of an image for uploading onto the Web or for printing without modifying the settings for shooting. This may save the effort to modify the settings. In addition, it is highly advantageous that the second image (the image for printing) may be generated during the rec-review or replay of the first image.

In this embodiment, while the first image is being displayed, the display/sound unit 54 may provide a display indicating existence or absence of the corresponding second image. When the first image is deleted, the corresponding second image may also be deleted at the same time. This may advantageously reduce cumbersome operations.

In this embodiment, the digital camera may be connected to an external apparatus, such as a personal computer, via the communication unit 110 to transmit the first image or second image to the external apparatus. In that case, the system control circuit 50 may be adapted to delete the transmitted image from the storage medium 200 or 210. If the second image has been transmitted to the external apparatus, the system control circuit 50 may be adapted to delete the transmitted second image and the corresponding first image from the storage medium 200 or 210.

It is to be understood that the object of the present invention may be also accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Patent Application No. 2005-205766, filed Jul. 14, 2005, which is hereby incorporated by reference herein in its entirety.

What is claimed is:

1. An image storage apparatus comprising:
   a shooting unit that shoots a subject and outputs image information;
   an image processing unit that processes the image information as an image;
   a system control unit that stores the processed image in a storage medium;
   a display unit that displays the image information output from said shooting unit;
   an image quality determination unit that determines the image quality of the image to be stored in the storage medium;
   a recording mode selection unit having at least a first selectable recording mode, a second selectable recording mode, and a third selectable recording mode,
   wherein in the first selectable recording mode, said system control unit stores a first image following a digital camera format and having an image quality determined by said image quality determination unit in a first folder in the storage medium, and stores at least one of second images not following the digital camera format and having an image quality determined by said image quality determination unit but different from the image quality or size of the first image, in a second folder in the storage medium,
   wherein in the second selectable recording mode, said system control unit does not store the at least one of second images but stores only the first image in the storage medium,
   wherein in the third selectable recording mode, said system control unit does not store the first image but stores only the at least one of second images in the storage medium, and wherein the at least one of second images is the same shot image as the first image but a different version of the first image; and
   a designation control unit that allows a user in each of the first and third selectable recording modes to designate the number of the second images not following the digital camera format to be stored in the storage medium, and does not allow the user in the second selectable recording mode to designate the number of the first image following the digital camera format to be stored in the storage medium,
   wherein if the number of the second images designated by the user is two, said system control unit generates two second images from a single image and stores the two second images in the storage medium.

2. The image storage apparatus according to claim 1, wherein said system control unit creates the first folder and the second folder in the storage medium when the processed image is stored in the storage medium.

3. The image storage apparatus according to claim 1, wherein the structure of the first folder and the stored-image name of the first image stored in the first folder follow the digital camera format, and the structure of the second folder and the stored-image name of the second image stored in the second folder do not follow the digital camera format.

4. The image storage apparatus according to claim 1, wherein the second image stored in the second folder has at least one of a smaller size, a higher sharpness, a higher color saturation, or a different aspect ratio, compared to the first image stored in the first folder.

5. The image storage apparatus according to claim 1, wherein the second image stored in the second folder has date and time information embedded therein.

6. The image storage apparatus according to claim 1, wherein the second image stored in the second folder has a predetermined upper limit value on a data size.

7. The image storage apparatus according to claim 1, further comprising a number-of-stored-images determination unit that determines the number of second images stored in the second folder, wherein as many second images as determined by said number-of-stored-images determination unit are stored in the second folder.

8. The image storage apparatus according to claim 1, further comprising:
   a display mode selection unit that has a first, second, and third display modes,
   wherein said display unit also displays an image shot by said shooting unit, and
   wherein said display mode selection unit displays the first image and the second image in the first display mode, only the first image in the second display mode, and only the second image in the third display mode.

9. The image storage apparatus according to claim 8, wherein when the first image or the second image is being displayed, said display unit simultaneously displays indication information that indicates whether the information being displayed is the first image or the second image.

10. The image storage apparatus according to claim 1, further comprising an image deletion unit that deletes at least one of the first image or the second image stored in the storage medium.

11. The image storage apparatus according to claim 10, wherein said image deletion unit simultaneously deletes the second image corresponding to the first image when the first image is deleted from the storage medium.

12. The image storage apparatus according to claim 10, further comprising:
a connection unit that connects to an external apparatus; and
a transmission unit that transmits at least one of the first image or the second image stored in the storage medium to the external apparatus via said connection unit,
wherein said image deletion unit deletes from the storage medium the image transmitted to the external apparatus.

13. The image storage apparatus according to claim 12, wherein when the second image is transmitted to the external apparatus from said transmission unit, said image deletion unit deletes from the storage medium the second image transmitted to the external apparatus and the first image corresponding to the second image.

14. The image storage apparatus according to claim 1, wherein:
said display unit also displays an image shot by said shooting unit,
the image storage apparatus further comprises:
a storage instruction unit that instructs to store the second image in the second folder when the first image is being replayed on said display unit; and
a second image generation unit that generates the second image from the first image being replayed on said display unit according to an instruction of said storage instruction unit.

15. An image storage method comprising:
a shooting step of shooting a subject and outputs image information;
an image processing step of processing the image information as an image;
an image storing step of storing the processed image in a storage medium;
an information displaying step of displaying the image information output in said shooting step on a display unit;
an image quality determination step of determining the image quality of the image to be stored in the storage medium; and
a recording mode providing step of providing a first selectable recording mode, a second selectable recording mode, and a third selectable recording mode,
wherein in the first selectable recording mode, said image storing step stores a first image following a digital camera format and having an image quality determined by said image quality determination step in a first folder in the storage medium, and stores a second image not following the digital camera format and having an image quality determined in said image quality determination step but different from the image quality or size of the first image, in a second folder in the storage medium,
wherein in the second selectable recording mode, said image storing step does not store the at least one of second images but stores only the first image in the storage medium,
wherein in the third selectable recording mode, said image storing step does not store the first image but stores only the at least one of second images in the storage medium, and wherein the at least one of second images is the same shot image as the first image but a different version of the first image;
a designation controlling step of allowing a user in each of the first and third selectable recording modes to designate the number of the second images not following the digital camera format to be stored in the storage medium, with a designation control unit, and not allowing the user in the second selectable recording mode to designate the number of the first image following the digital camera format to be stored in the storage medium; and
an image generating step of, if the number of the second images designated by the user is two, generating two second images from a single image and storing the two second images in the storage medium.

16. A non-transitory computer-readable storage medium storing a computer program executable by an image storage apparatus, the computer program comprising:
a shooting module for shooting a subject and outputting image information;
an image processing module for processing the image information as an image;
an image storing module for storing the processed image in a storage medium;
an information displaying module for displaying the image information output by said shooting module on a display unit;
an image quality determination module for determining the image quality of the image to be stored in the storage medium;
a recording mode providing module for providing a first selectable recording mode, a second selectable recording mode, and a third selectable recording mode,
wherein in the first selectable recording mode, said storing module stores a first image following a digital camera format and having an image quality determined by said image quality determination module in a first folder in the storage medium, and stores at least one of second images not following the digital camera format and having an image quality determined by said image quality determination module but different from the image quality or size of the first image in a second folder in the storage medium,
wherein in the second selectable recording mode, said image storing module does not store the at least one of second images but stores only the first image in the storage medium,
wherein in the third selectable recording mode, said image storing module does not store the first image but stores only the at least one of second images in the storage medium, and wherein the at least one of second images is the same shot image as the first image but a different version of the first image;
a designation controlling module for allowing a user in each of the first and third selectable recording modes to designate the number of the second images not following the digital camera format to be stored in the storage medium, and not allowing the user in the second selectable recording mode to designate the number of the first image following the digital camera format to be stored in the storage medium; and
an image generating module for, if the number of the second images designated by the user is two, generating two second images from a single image and storing the two second images in the storage medium.

* * * * *